US008806062B1

(12) United States Patent
Vertongen et al.

(10) Patent No.: US 8,806,062 B1
(45) Date of Patent: Aug. 12, 2014

(54) ADAPTIVE COMPRESSION USING A SAMPLING BASED HEURISTIC

(75) Inventors: Mark Vertongen, Wetteren (BE); Bastiaan Stougie, Melle (BE); Mark Christiaens, Aalter (BE)

(73) Assignee: Symantec Corporation, Mountain View, CA (US)

( * ) Notice: Subject to any disclaimer, the term of this patent is extended or adjusted under 35 U.S.C. 154(b) by 444 days.

(21) Appl. No.: 12/413,137

(22) Filed: Mar. 27, 2009

(51) Int. Cl.
*G06F 15/16* (2006.01)
*H04L 29/08* (2006.01)

(52) U.S. Cl.
CPC .............................. *H04L 29/08783* (2013.01)
USPC ....................................................... 709/247

(58) Field of Classification Search
CPC .............................................. H04L 29/08783
USPC ............................. 709/247; 341/50
See application file for complete search history.

(56) References Cited

U.S. PATENT DOCUMENTS

| | | | | |
|---|---|---|---|---|
| 5,333,212 A * | 7/1994 | Ligtenberg | | 382/250 |
| 6,718,361 B1 * | 4/2004 | Basani et al. | | 709/201 |
| 7,222,233 B1 * | 5/2007 | Rubin | | 713/168 |
| 7,460,032 B2 * | 12/2008 | Boldt et al. | | 341/50 |
| 7,640,363 B2 * | 12/2009 | Teodosiu et al. | | 709/247 |
| 2002/0069363 A1 * | 6/2002 | Winburn | | 713/200 |
| 2004/0236803 A1 * | 11/2004 | Spiegeleer | | 707/204 |
| 2007/0100913 A1 * | 5/2007 | Sumner et al. | | 707/204 |
| 2008/0126431 A1 * | 5/2008 | Walliser et al. | | 707/200 |
| 2009/0100195 A1 * | 4/2009 | Barsness et al. | | 709/247 |

OTHER PUBLICATIONS

Jeannot, Emmanuel, et al., "Adaptive Online Data Compression", pp. 1-10. Downloaded from http://view.samurajdata.se/psview.php?id=5154cf45&page=1&all=1, on Mar. 27, 2009.
Patrick Lesslie, "Re: [Openvpn-users] Adaptive compression State", pp. 1-2. Feb. 18, 2004. Downloaded from http//openvpn.net/archive/openvpn-users/2004-02/msg00185.html, on Mar. 27, 2009.
Krintz, Chandra, et al., "Adaptive On-the-Fly Compression", IEEE Transactions on Parallel and Distributed Systems, vol. 17, No. 1, Jan. 2006, pp. 15-24.

* cited by examiner

*Primary Examiner* — Rupal Dharia
*Assistant Examiner* — Robert B McAdams
(74) *Attorney, Agent, or Firm* — Campbell Stephenson LLP

(57) ABSTRACT

Various methods and systems for using adaptive data compression in a backup system are disclosed. One method involves detecting whether to compress a unit of storage that is to be backed up. The detecting involves attempting to compress a portion of the unit of storage. If the attempt to compress the portion of the unit of storage meets a specified compression performance threshold, i.e., if the unit of storage is compressible, the unit of storage is compressed. Otherwise the unit of storage is not compressed.

18 Claims, 7 Drawing Sheets

ADAPTIVE COMPRESSION USING A SAMPLING BASED HEURISTIC

FIELD OF THE INVENTION

The present disclosure relates generally to data backup and transmission over a network, more particularly, to using adaptive data compression in a backup system.

BACKGROUND OF THE INVENTION

A typical backup system performs backup operations in a network environment that includes one or more client nodes connected to a backup server. When performing a data backup operation, data to be backed up is transmitted via the network from a client node to the backup server. As will be appreciated, data compression can be used to improve the performance of backup systems. Compressing data prior to transmission can be beneficial in a number of ways. Benefits of compressing data prior to transmission include reducing network bandwidth requirements, preventing network congestion, reducing the amount of storage required at the backup server, and increasing the speed of backup operations. For example, assume a file maintained by a client machine is to be backed up to a backup server. A bandwidth savings is realized, e.g., less data needs to be transmitted over the network, if the file is compressed to a smaller size before transferring the file from the client node to the backup server. Also, the compressed file, being smaller, takes up less storage space at the backup server.

While compressing data prior to transmission can be beneficial, doing so is not without cost. Compressing data requires resources, such as time and processing power. Moreover, not all data are equally amenable to compression. For instance, data that is already compressed is likely to be more difficult to compress further, as compared to other, uncompressed data. Similarly, the resources consumed in compressing small amounts of data may not be justified. In some scenarios the cost of the resources necessary to compress data as part of a backup process may outweigh the benefits of doing so.

SUMMARY OF THE INVENTION

Various embodiments of systems and methods for determining whether to compress data prior to transmission of the data are disclosed. In one embodiment, a method involves detecting whether a unit of storage is to be backed up. In response to the detecting, an evaluation is made as to whether the unit of storage should be compressed. The evaluation involves attempting to compress a portion of the unit of storage. If the evaluation indicates that the unit of storage should be compressed, the method then involves compressing the unit of storage.

The foregoing is a summary and thus contains, by necessity, simplifications, generalizations and omissions of detail; consequently those skilled in the art will appreciate that the summary is illustrative only and is not intended to be in any way limiting. Other aspects, inventive features, and advantages of the present invention, as defined solely by the claims, will become apparent in the non-limiting detailed description set forth below.

BRIEF DESCRIPTION OF THE DRAWINGS

A more complete understanding of the present invention may be acquired by referring to the following description and the accompanying drawings, in which like reference numbers indicate like features.

Figure 1:
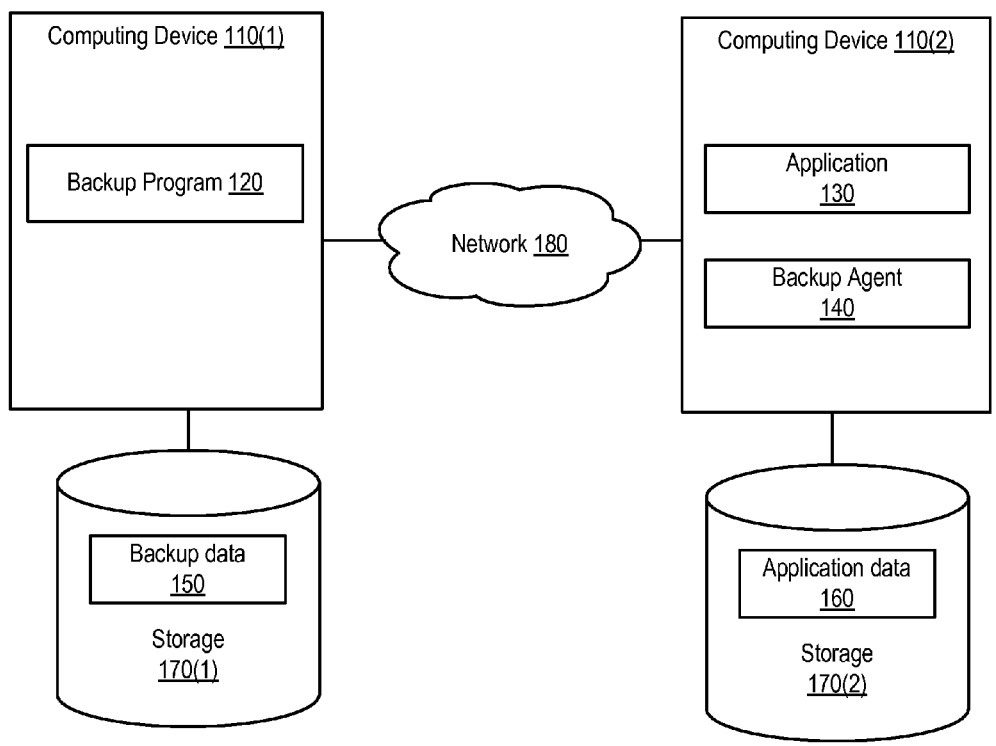
FIG. 1 is a block diagram of a computing system that performs adaptive compression, according to one embodiment.

While the invention is susceptible to various modifications and alternative forms, specific embodiments of the invention are provided as examples in the drawings and detailed description. It should be understood that the drawings and detailed description are not intended to limit the invention to the particular form disclosed. Instead, the intention is to cover all modifications, equivalents and alternatives falling within the spirit and scope of the invention as defined by the appended claims.

DETAILED DESCRIPTION

Data compression involves a transformation of data that reduces the number of bytes, or amount of storage space, needed to represent or store a given amount of information. Reducing the size of a unit of storage is one way to achieve data compression. For example, a file may be compressed to a fraction of its original size. Alternatively, the space occupied by a unit of storage may remain the same, but may have additional information added thereto. In some cases, data compression involves increasing the information density in a given unit of storage. In other cases, data is replaced with codes representing the data such that a larger set of data is represented using a smaller amount of information.

A compression algorithm is a series of steps or operations which defines a method for compressing data. Various compression algorithms and techniques can be used to compress data according to one embodiment. Compression algorithms can be evaluated on certain performance characteristics. Examples of characteristics upon which compression algorithms can be evaluated include speed, efficiency, and data loss.

The speed of a given compression algorithm refers to the amount of time required to compress a given amount of storage using that algorithm. The method implemented by a first algorithm to compress a given unit of storage by a certain amount may take more or less time than another compression algorithm would take to achieve the same results. The way a compression algorithm works, e.g., the steps the algorithm performs, can affect the performance of the algorithm.

The efficiency of a compression algorithm refers to the change in size or information density of a unit of storage before and after being compressed using the algorithm. The change can be expressed as a compression ratio (ratio between a unit of storage's size before and after compression), or percentage. For example, a compression algorithm that reduces a file to 30% of the file's original size has a compression ratio of 3.33 and is more efficient than a compression algorithm that reduces the file to 50% (compression ratio of 2) of the file's original size. The higher the compression ratio, the smaller the unit of storage is after being compressed (relative to its size before being compressed).

Data loss refers to the amount of data that is unrecoverable in a decompress operation as a result of the compression operation. This amount can range from zero (a "lossless" algorithm) to more "lossy" algorithms. For example, less data is required to express 3.141592 as 3.14 (3 numerical digits as opposed to 7). This is one example of a compression algorithm (round to two decimal places). Doing so requires 4 less digits to represent the number, but "loses" the data after the second decimal place.

Compressibility refers to the degree to which data can be compressed. Some data is more or less compressible than other data. Compressibility of data depends, in part, on the nature or type of the data as well as the algorithm used. Data that has been compressed previously is likely to be less compressible than data which has not. Data that has predictable patterns is generally more compressible than more random data.

Generally, if data is less compressible, attempting to compress the data requires more resources. That is, it generally takes more time and/or more CPU cycles to compress data that is less compressible (e.g., as a result of having been compressed already) than would be required for data that is more compressible. For example, a greater number of CPU cycles is required to compress a unit of storage (e.g., a file) that is less compressible to 30% of the unit of storage's original size (if such further compression is even achievable) than to compress the unit of storage if the unit of storage were more compressible. Similarly, more time is required to compress the unit of storage that is less compressible. Also, it may be impossible to compress further data that has already been compressed, so attempting to do so will provide no benefit.

One primary function of a backup system is to create and store at least one copy of a set of data. A backup system generally includes some mechanism to achieve this function. The mechanism can include a backup server. A backup server can be implemented as one or more computing devices on which a backup program is installed. The mechanism can also include one or more computing devices on which a backup agent installed. The backup program and backup agent facilitate backup operations, as is described below. At a specified time or interval, or in response to detecting some condition or event, the backup program triggers a backup operation. The backup operation can include creating a copy of data from a first storage location, transmitting the copy to a second storage location, and storing the copy in the second storage location.

Backup operations can be scheduled on a regular, periodic basis. Significant efforts are made to minimize resources consumed by backing up data, as well as the impact that backup operations have on regular operations of computer systems. These efforts can include scheduling backup for periods of anticipated low system resource usage, such as in the middle of the night. In some cases, a backup operation must be initiated and completed quickly. For example, when a device is failing, an emergency backup operation is triggered to quickly backup the data from the failing device. In such a case, it is important to backup the data in as efficient a manner as possible since the resources available to the failing device may be limited.

In one embodiment, detecting whether a unit of storage is compressible involves a backup system attempting to compress a portion of the unit of storage. If the backup system detects that the attempt to compress the portion was successful, e.g., that some measure of the compression algorithm's performance exceeded a predetermined threshold, the backup system indicates that the unit of storage is compressible. If the unit of storage can be successfully compressed, the backup system creates a copy of the unit of storage, compresses the copy of the unit of storage, and transmits the compressed copy of the unit of storage to a backup location so that the compressed copy of the unit of storage can be stored at the backup location.

Many of the examples disclosed herein are disclosed n terms of file-based backup, e.g., a backup operation where the specified unit of storage is a file. As will be appreciated in light of the present disclosure, the techniques described herein are not limited to file-based backup. To the contrary, the techniques described herein are equally applicable to backup operations on other units of storage, e.g., volume-level backups (where one or more volumes is specified as the unit of storage to be backed up) or block-level backups (where one or more blocks is specified as the unit of storage to be backed up).

This disclosure refers to operations on units of storage. A unit of storage can be any amount of digital information stored on a volume or other storage device. Such data can be grouped, e.g., into a file, a segment (a portion of a file), or a block (physical grouping of data on a storage device). FIG. 1 illustrates a computing system that performs adaptive data compression according to one embodiment. As shown, the computing system includes two computing devices 110(1) and 110(2). Each computing device can be a personal computer, laptop computer, server, personal digital assistant, cell phone, or the like. Computing device 110(1) functions as a backup server, implementing a backup program 120, such as PureDisk, available from Symantec Corporation of Cupertino, Calif. Computing device 110(2) functions as a client node, implementing an application 130 and a backup agent 140. Although FIG. 1 shows one computing device 110(2), there can be multiple client devices in the computing system of FIG. 1. Computing device 110(1) is coupled to communicate with computing device 110(2) via network 180, which can include a bus, interconnect, and/or network (e.g., a local area network (LAN), storage area network (SAN), wide area network (WAN) or the like).

Computing device 110(1) is also coupled to storage device 170(1), which stores backup data 150. Similarly, computing device 110(2) is coupled to storage device 170(2), which stores application data 160. Backup data 150 can include backup copies of some or all of application data 160. Storage devices 170(1) and 170(2) each provide persistent data storage. Each storage device can be, for example, a hard disk, a compact disc (CD), a digital versatile disc (DVD), or other mass storage device, or a storage system (e.g., a redundant array of independent disks (RAID) system or an optical storage jukebox) that includes an array of such storage devices. Storage device 170 can also be a virtual or logical storage device that is implemented on such physical storage devices and/or storage systems. For example, storage device 170(1) can be a logical volume that is implemented on a RAID storage system.

One or more users can use computing device 110(2) to generate and/or manipulate data, such as files (e.g., executable files, directory files, data files) and other information (e.g., metadata). Copies of the data can be maintained locally (e.g., on a hard drive or other storage device or set of storage devices directly coupled to computing device 110(2)) or remotely (e.g., on a storage device coupled to a network). The data is generated by software such as application 130, which can comprise, for example, an operating system, utility, programming language, or user application (e.g., word processing program, email program, graphics program, a database application, or the like) that executes on computing device 110(2). Although FIG. 1 shows a single application, multiple applications may be executed on computing device 110(2).

Computing device 110(1) implements backup program 120. A user (e.g., a system administrator) of computing device 110(1) can configure backup program 120 to control aspects of backup operations and manage backup data 150. The user can specify various parameters related to backup operations, such as when to initiate a backup operation, what data to backup, and where to store the data that is to be backed up. A backup operation involves creating a copy of a unit of storage and storing the copy in backup storage. For example, backup program 120 can instruct backup agent 140 to create a copy of a file stored in application data 160. Once the copy is created, backup agent 140 can transmit the copy to backup program 120, which can store the file in backup data 150.

Computing device 110(2) implements backup agent 140. Additional functions backup agent 140 can perform include monitoring data 160 and detecting modifications thereto. If backup agent 140 detects a modification to data 160, backup agent 140 can initiate a backup operation. Backup agent 140 can also respond to commands from backup program 120 to backup data. Backup program 120 can initiate backup operations according to a predefined schedule, such as nightly, weekly, or monthly, for example. Backup agent 140 is also able to encrypt data and transmit data, e.g., to backup program 120.

A backup operation includes selecting or specifying which data should be backed up. In one embodiment a user of backup program 120 specifies, using backup program 120, which data to include in a backup operation. The user can designate a particular file, group of files, volume, or other unit of storage to be included in a backup operation.

A system according to one embodiment allows a user to specify conditions under which a backup operation is to be performed. For example, a user can first specify a particular file for backup and specify that the file should be backed up immediately. Alternatively, the user can schedule backup operations to occur at a later time. For example, a user can specify that a backup operation is to be performed at a time when computer resource usage is expected to be relatively low, such as in the middle of the night. The user can also specify that backup operations should occur on a periodic basis. For example, a user of computing device 110(1) can specify (using backup program 120) that a backup operation is to occur once a week at a particular day and time. In this case, once the user specifies a particular day and time, backup program 120 performs a backup operation on the selected data (e.g., a file) at the specified day and time each week.

In one embodiment, detection of a certain condition or event can trigger a backup operation. For example, a user can configure backup agent 140 to determine whether a particular file has been modified. When backup agent 140 detects that the file has been modified, that file is included in a backup operation. In one embodiment, agent 140 is configured to detect whether a file selected to be included in a periodic backup operation has been modified since a previous backup operation. If backup agent 140 detects that the file has not been modified since a previous backup, the file is excluded from the periodic backup operation. Alternatively, the file can be included in the backup operation without regard to previous modification.

In another embodiment, a backup operation occurs immediately upon detection of a modification to a selected unit of storage. In this embodiment, whenever a modification to the file is detected, the file will be included in a backup operation. Modification can include, for example, updating a file, creating a new file, deleting a file, or moving a file.

A backup operation can also involve detecting whether a unit of storage selected for backup has already been backed up. If backup program 120 detects that a unit of storage selected for inclusion in a backup operation already exists in backup data 150, backup program 120 can cancel the pending backup of the unit of storage, or remove the unit of storage from the pending backup operation. For example, if a user selects a given file to be included in a weekly backup, but the file has not been modified since being previously backed up, the file may not need to be backed up again. In this case, backup program 120 can detect that the file does not need to be backed up and can exclude the file from backup operations.

Backup program 120 also interacts with backup agent 140 and storage device 170(1) to indicate whether data has already been stored in backup data 150 and thus does not need to be included in a backup operation. In one embodiment, backup program 120 stores an identifier for each unit of storage in backup data 150. When a unit of storage is to be backed up, backup program 120 instructs backup agent 140 to calculate an identifier for the unit of storage. Backup agent 140 can then calculates and transmits the identifier to backup program 120. In turn, backup program 120 compares the identifier with identifiers for units of storage stored in backup data 150. If the identifier matches an identifier for a unit of storage stored in backup data 150, the unit of storage has been backed up already and need not be backed up again. Upon detecting matching identifiers, backup program 120 indicates to backup agent 140 that the unit of storage need not be backed up. In this case, backup program 120 removes the unit of storage from the pending backup operation. If the identifier does not match an identifier for a unit of storage stored in backup storage 150, backup program 120 can indicate that the unit of storage does not already exist in backup data 150 and should be included in the pending backup operation.

In another embodiment, backup agent 140 can maintain a list of identifiers representing data that is stored in backup data 150. In this embodiment, backup agent 140 can compare an identifier with the list of identifiers for data stored in backup data 150. When backup agent 140 maintains a list of identifiers representing data stored in backup data 150, backup agent 140 can receive updates to the list indicating addition or removal of additional data in backup data 150. Such updates can be received from backup program 120 or from another backup agent (not shown). Backup agent 140 can store the list locally (e.g., in local storage (not shown) maintained by computing device 110(2)) or in storage 170(2). Alternatively, the list can be stored in local storage (not shown) maintained by computing device 110(1) or in backup data 150.

In one embodiment, generating an identifier for a unit of storage involves calculating a hash key for the unit of storage. A unique hash key is generated for each unit of storage based on the contents of the unit of storage. Calculating a hash key for units of storage having identical contents results in identical values of the hash keys. If the contents of a unit of storage are not identical to the contents of another unit of storage, hash key values calculated for each unit of storage will not be identical. Thus, comparing the identifier calculated by backup agent 140 with an identifier stored by backup program 120 provides a determination as to whether a unit of storage having identical contents to the unit of storage to be backed up is already stored in backup storage. In alternative embodiments, an identifier may be generated based on some other method, as long as the method used to calculate the identifier results in an identifier that allows unique identification of a unit of storage having unique contents. For example, a checksum, or some other method, can be used as the basis of an identifier.

It is noted that comparing generated hash values is not necessarily completely determinative as to whether a unit of storage has been backed up already, i.e., in some embodiments there is some small chance that units of storage having different data get mapped to the same hash value. However, the use of hashes allows such determination to be made quickly and efficiently. If the chance of mapping different data to the same hash is sufficiently small, the chance of backing up data that has already been backed up is correspondingly small. In that case, it is relatively fast and efficient to use hashes to quickly determine whether units of storage have already been backed up.

In one embodiment, generating identifiers for a unit of storage is performed iteratively on different divisions of a unit of storage. For example, consider a file that is to be included in a backup operation. In this example, backup agent 140 generates an identifier (e.g., a hash key) for the file and transmits the identifier to backup program 120. Backup program 120 compares the identifier with identifiers stored in backup data 150. If the identifier is not found, the file deemed not to have already been stored in backup data 150 and backup program 120 indicates the backup operation is to proceed and backup the file. In this case, backup agent 140 can divide the file into a plurality of segments. A user of backup program 120 can specify a size for the segments. Alternatively, the number of segments for the file can be specified. Backup agent 140 can calculate an identifier for one or all of the segments and transmit the identifier(s) to backup program 120. Backup program 120 can compare the identifier(s) with identifiers for data stored in backup data 150. For each segment, if no matching identifier is found, backup program 120 indicates that the segment is not stored in backup data 150.

Backup program 120 can support the configuration of a number of parameters relating to data compression. For example, a user can turn data compression on or off altogether, or data compression can be turned on or off for particular units of storage (e.g., data compression can be turned on for one segment of a file and turned off for another segment of the file). Data compression can be turned on or off for a single backup operation, range of backup operations, or for a selected interval of time (e.g., day of the week). Data compression can also be turned on or off depending on the type of the file (e.g., data compression on for text files, off for image files, and so on). Data compression can also be turned on or off based on computer system or network resource considerations such as storage space, bandwidth, or CPU resource considerations. For example, data compression can be turned off if a storage device (e.g., storage device 70(1)) is less than 50% full, but turned on if the storage device is more than 50% full. In another example, data compression can be turned on if a network bandwidth threshold is exceeded.

Based on considerations such as those above, a user can select specific data compression algorithms or types of compression algorithms to be used. For example, in system where the CPU is highly utilized but there is abundant storage space, an algorithm which uses fewer CPU cycles (but which may be less effective) may be selected. In another example, if storage resources are critical, a user may select an algorithm which is highly effective (e.g., has a high compression ratio), but which may require more CPU cycles to achieve the desired degree of data compression.

In one embodiment, a list of data compression algorithms is available to a user of backup program 120. The list can include rankings and descriptions of the algorithms. Using this list, a user can select a particular algorithm for specific circumstances. Alternatively, a user can specify a characteristic (e.g., fast) and allow backup program 120 to automatically select a compression algorithm. In still another embodiment, backup program 120 can automatically select an algorithm without input from a user. Backup program 120 can automatically select an algorithm based on system performance or analysis of historical data. For example, backup program 120 can select an algorithm for a given file type based on an algorithm previously used with that file type. If the algorithm previously used was unsatisfactory in some way, backup program 120 can select a different algorithm based on information concerning the previous backup operation.

Alternatively, the user can select adaptive compression. In this embodiment, data compression is turned on or off for a given unit of storage based on the results of an attempt to compress a portion of the unit of storage. Adaptive compression also involves a number of compression parameters. These parameters can be set by a user or automatically set by backup program 120. For example, in addition to the parameters above, a user can specify a target compression performance threshold (e.g., target efficiency, or time).

When adaptive compression is active, an attempt is made to compress one or more portions of a unit of storage that has been selected for backup. If the attempt is successful, the unit of storage is compressed. Success can be measured by comparing any of several performance characteristics with a performance threshold. If the threshold is met, the entire unit of storage will be compressed. For example, a user can set a performance threshold at 30% of original size. When a unit of storage is selected for backup, an attempt is made to compress a portion of the unit of storage. If the portion is compressed to 25% of its original size, the attempt was successful and the entire unit of storage will be compressed. If the portion of the unit of storage is 50% of its original size after an attempt is made to compress it, the attempt was unsuccessful and the unit of storage containing the portion will not be compressed.

Different parameters can be set for compressing the portion and for compressing the entire unit of storage. For example, a user can specify a first compression algorithm for compressing the portion. If the attempt to compress the portion is successful, the user can specify a second, different, compression algorithm for compressing the entire unit of storage. This facilitates optimum backup system performance. For example, for the attempt to compress a portion, a user can specify a relatively fast algorithm. This reduces the time spent determining whether a unit of storage is to be compressed. Then for compressing the entire unit of storage, the user can specify a different algorithm, for example an algorithm that is highly effective, but which may not be as fast as the first. This increases the benefits (such as bandwidth and storage reductions) that data compression provides.

Another parameter that a user can set for adaptive compression is location in the unit of storage where the portion should be taken from for an attempt to compress operation. For example, a user can specify whether the portion is selected from the middle of the unit of storage, or at the beginning or end of the unit of storage. In one embodiment, the user specifies an offset from the beginning of the unit of storage. An attempt to compress a portion of the unit of storage beginning at the offset can then be made. The location in the unit of storage where the portion is taken from can affect the outcome of compression since the unit of storage may have data with different characteristics (leading to different compressibility) in different areas of the unit of storage. In one embodiment, a user can specify criteria which inform the choice of location within the unit of storage from which the portion is selected. For example, a user can specify that the portion should come from a location that matches or exceeds a certain data density, e.g., locations in the unit of storage which contain more than a certain number of characters per page or higher than a specified ratio of written to unwritten locations in a storage block. A component of the backup system (e.g., backup program and/or backup agent) can then scan the unit of storage for data which matches the specified density. If data having such density is found in the unit of storage, the portion can be selected from the location where the density matches the specified density.

Figure 2:
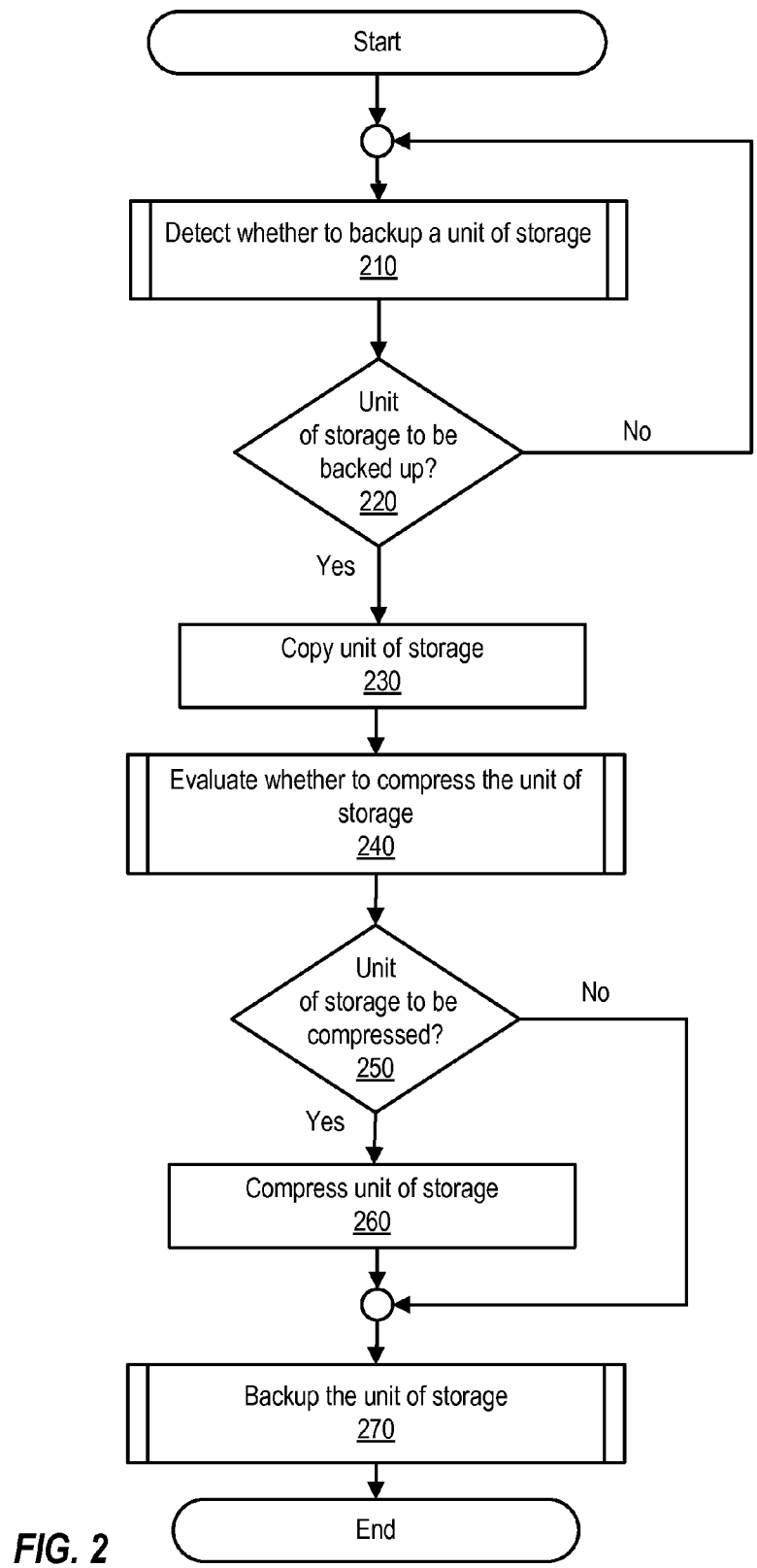
FIG. 2 is a flowchart of a method of performing adaptive compression, according to one embodiment.

FIG. 2 is a high level flowchart of a method of performing adaptive compression, according to one embodiment of the present invention. This method can be performed by a computing system such as the computing system shown in FIG. 1 or any other computing system configured to perform backup operations using adaptive compression. The method can be used to improve computer system resource usage by only compressing units of storage for which compression is beneficial.

The method begins at process operation 210 (described in greater detail with regard to FIG. 3), in which a backup program (e.g., backup program 120 of FIG. 1) detects whether to perform a backup operation. Whether a unit of storage is to be backed up can depend, for example, on detecting whether the unit has been modified or selected to be included in a scheduled backup operation. Such detection can be based on information communicated to the backup program (e.g., from a backup agent such as backup agent 140 of FIG. 1). Alternatively, the detection can be based on information available only to the backup program. Detecting whether to perform a backup operation also involves identifying a particular unit of storage and detecting whether that unit of storage has already been backed up.

If a unit of storage is to be backed up (decision block 220), the method proceeds to operation 230, which shows that a copy of the unit of storage is created. Otherwise, the method returns to the start. After creating a copy of the unit of storage, the method proceeds to process operation 240 (discussed in greater detail with regard to FIG. 4). Process operation 240 shows evaluating whether to compress the unit of storage. The backup program and backup agent can work together to determine whether the unit of storage should be compressed. The backup program can provide control and configuration settings and parameters to the backup agent. The backup agent can receive the parameters and attempt to compress a portion of the unit of storage. Based on the results of the compression, the backup agent can indicate whether the entire unit of storage should be compressed. If the unit of storage is to be compressed (decision block 250), the unit of storage is compressed at operation 260 and the method proceeds to operation 270. Otherwise, the method skips operation 260.

Finally, at process operation 270 (discussed in greater detail with regard to FIG. 5), the unit of storage is backed up. Backing up the unit of storage involves encrypting the unit of storage and transmitting the encrypted copy to the backup program. The backup program can store the encrypted unit of storage in backup storage (e.g., backup data 150 of FIG. 1). Additionally the backup program can store an identifier for the unit of storage. In one embodiment, the backup agent generates the identifier and transmits the identifier to the backup program. However, in some embodiments, the backup program generates an identifier for the unit of storage.

Figure 3:
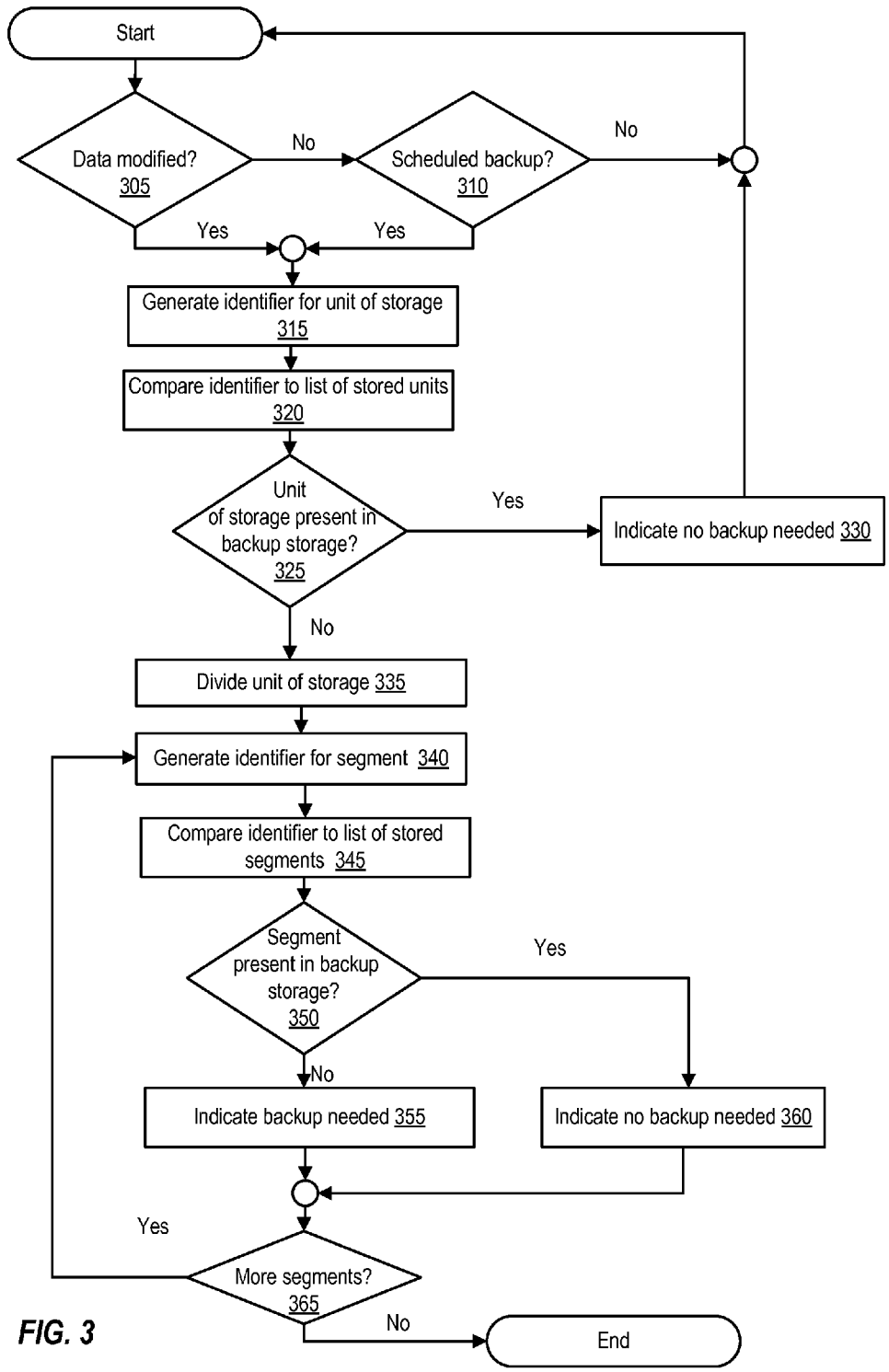
FIG. 3 is a flowchart of a method of detecting whether a unit of storage needs to be backed up, according to one embodiment.

FIG. 3 is a flowchart detailing process operation 210 of FIG. 2. FIG. 3 shows a method of detecting whether a unit of storage is to be backed up, according to one embodiment of the present invention. This method can be performed by a computer system (such as that of FIG. 1) having a backup program (e.g., backup program 120 of FIG. 1) and backup agent (e.g., backup agent 140 of FIG. 1). The method begins by detecting a preliminary indication that a unit of storage is to be backed up. Decision block 305 shows checking to see if modification to data is detected. In one embodiment a backup agent (e.g., backup agent 140 of FIG. 1) detects any modification. The modification to data can be as a result of an application (e.g., application 130 of FIG. 1) accessing data (e.g., application data 160 of FIG. 1). Whenever the application performs an operation which can affect a given unit of storage, the backup agent detects the operation. Such operations can include, for example, updating a unit of storage, moving a unit of storage, creating a new unit of storage, or deleting a unit of storage. Such an operation comprises a preliminary indication that the unit of storage is to be backed up. When the backup agent detects an operation or modification, the backup agent generates an identifier for the unit of storage at operation 315.

If no data modification is detected, the method proceeds to decision block 310, where a check is made to detect whether any units of storage are to be included in a scheduled backup. In one embodiment, the backup agent receives information from the backup program indicating that one or more specific units of storage are to be backed up. When such information is received, the method proceeds to operation 315 and the backup agent generates an identifier for the indicated unit of storage. If the backup agent does not detect a scheduled backup affecting any units of storage, the method returns to the start and the checks are repeated. The method can cycle through these checks indefinitely until a preliminary indication is detected that a unit of storage is to be backed up. The method can perform these checks with regard to specified units of storage (e.g., a user may specify that a particular set of files is to be included in the checks) or for all available data (e.g., application data 160).

Once a unit of storage has been identified as needing to be backed up (as a result of being modified or included in a scheduled backup operation, or for other reasons) the backup system determines if the unit of storage has already been backed up. In order to do so, the backup agent generates an identifier for the unit of storage at operation 315. In one embodiment, generating the identifier comprises calculating a hash value for the contents of the unit of storage. In other embodiments, a checksum, or other technique can be used.

Operation 320 shows detecting whether the unit of storage is already stored in backup storage (e.g., backup data 150 of FIG. 1). If a unit of storage is determined to already be stored in backup storage, the backup system avoids creating another backup copy of the unit of storage. Operation 320, shows comparing the identifier for the unit of storage to a list of identifiers for units of storage stored in backup storage. In one embodiment, the backup agent sends the identifier to the backup program. The backup program receives the identifier and compares the received identifier with a list (maintained by the backup program) of identifiers for some or all units of storage stored in backup storage. In another embodiment, the backup agent maintains the list and performs the comparison. In one embodiment, the backup system performs the check to determine whether a unit of storage has been backed up while the backup system evaluates whether to compress the unit of storage. Doing so can provide an additional time saving since if the backup system determines that the unit of storage has not already been backed up the backup system will not have to wait for the evaluation regarding whether to compress the unit of storage to be made.

If, at decision block 325, a match is detected, the unit of storage has already been copied to backup storage. In this case, the backup program (or backup agent) indicates (at operation 330) that there is no need to backup the unit of storage and the method returns to the start and waits for further indication that a unit of storage is to be backed up. If an identifier generated by the backup agent is not found in the list, backup storage does not contain a unit of storage having identical contents to the unit of storage needing backup. However, previous backup operations may have backed up some of the data contained in the unit of storage. In order to determine whether some of the data stored in the unit of storage has already been backed up (and so need not be backed up again) operation 335 shows that the backup agent partitions the unit of storage, or divides the unit of storage into smaller pieces, called segments. A user of the backup program can specify the manner of the partitioning. For example, the size or number of the segments may be specified.

At operation 340, the backup agent generates a segment identifier for one of the segments. The identifier can be a hash key, as described above. However, the method used to generate the segment identifier need not be the same method used to generate the identifier for the unit of storage. Next, operation 345 shows comparing the generated identifier for the segment to one or more identifiers contained in a list of identifiers that identify segments stored in backup storage. In one embodiment, the backup agent sends the identifier to the backup program. The backup program maintains the list of identifiers for some or all segments stored in backup storage. In another embodiment, the backup agent maintains the list and performs the comparison.

If, at decision block 350, a match is detected, a segment with identical data is already stored and the backup program need not backup the segment again. In this case, the backup program (or backup agent) indicates (at operation 360) that there is no need to backup the unit of storage and the method proceeds to operation 365, where the backup agent checks if there are more segments in the unit of storage. If there are more segments to be processed, the method returns to operation 340 and generates an identifier for the next segment.

On the other hand, if the segment identifier is not included in the list of identifiers, the backup program (or backup agent) indicates (at operation 355) that the segment needs to be backed up. In one embodiment, backup agent adds the segment identifier to a list of identifiers awaiting backup. Identifiers in the list are included in the next backup operation. Alternatively, the backup agent can initiate a backup operation immediately upon detecting a segment to backup.

Figure 4:
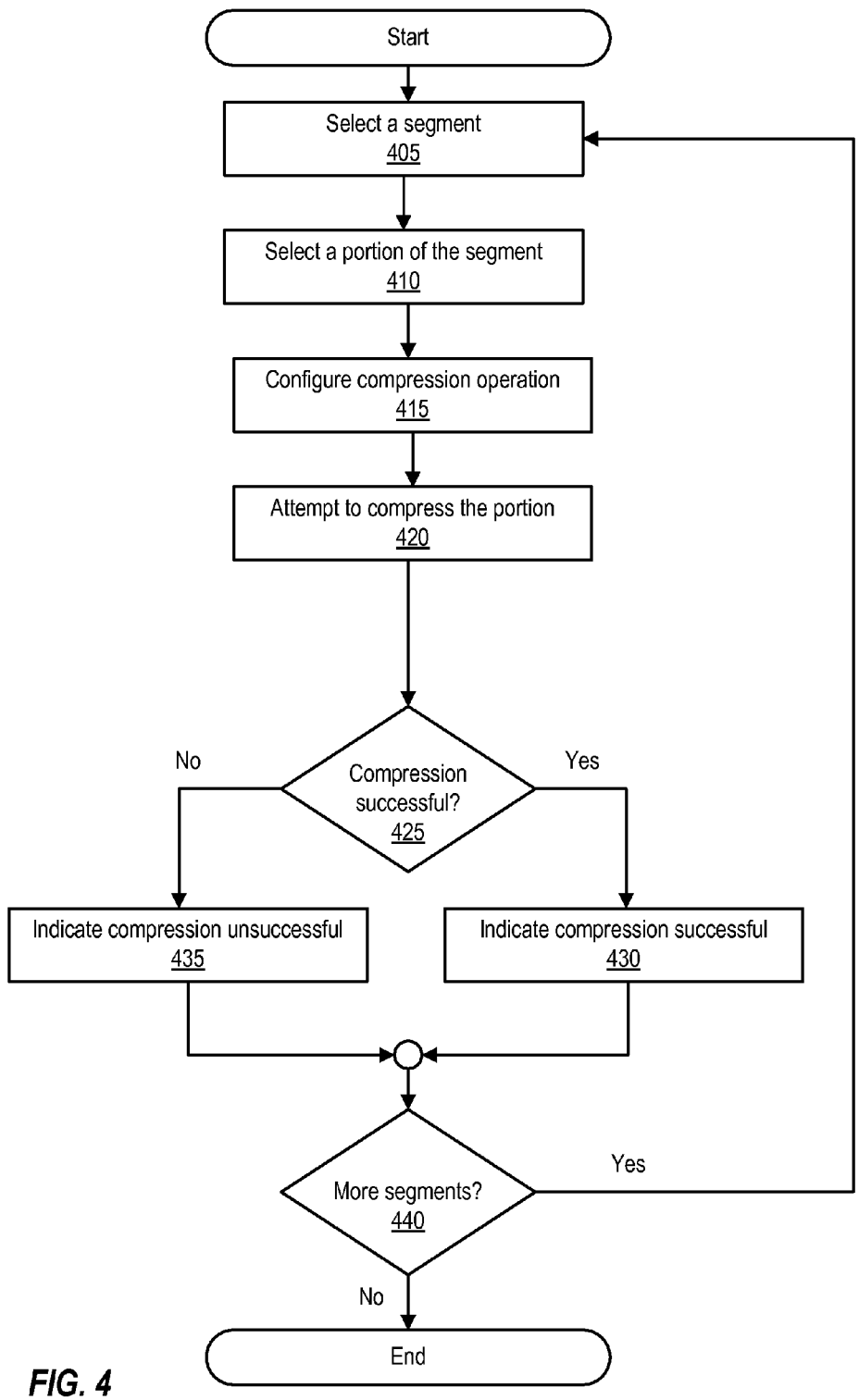
FIG. 4 is a flowchart of a method of evaluating whether a unit of storage should be compressed, according to one embodiment.

FIG. 4 is a flowchart detailing process block 240 of FIG. 2. FIG. 4 shows a method of evaluating whether a unit of storage should be compressed, according to one embodiment of the present invention. This method can be performed by a backup agent, such as backup agent 140 of FIG. 1. The method begins with selecting a segment of the unit of storage at operation 405. The backup agent can select the first segment in the unit of storage. Alternatively, the backup agent can select a segment based on a list of segments, in which case a determination has been made that each segment in the list should be backed up. That is, each segment in the list is part of a unit of storage that has been modified or for which a scheduled backup operation is to be performed, and each segment in the list is not already stored in backup storage.

Once a segment is selected, operation 410 shows selecting a portion of the segment. A user can configure the backup program to specify the size of the portion and the location of the portion within the segment, or such parameters can be determined algorithmically. For example, the backup program can detect that portions that exceed a certain size require too long to attempt to compress and that the size of the portion should be limited to a certain maximum size. In another example, the backup program can detect that portions that are too small provide inaccurate projections as to the compressibility of the segment as a whole and impose a minimum portion size.

Next, the compression operation is configured at operation 415. Operation 415 includes specifying the data compression algorithm or type of algorithm used for compression. Factors such as speed and effectiveness of various compression algorithms can be considered. Typically, speed is a primary factor in selecting the algorithm used to attempt to compress a portion of a segment. In such a case, the algorithm used for compressing the portion should be a relatively fast algorithm. Using a fast algorithm to compress the portion facilitates quickly determining whether the segment should be compressed. This facilitates rapid initiation of backup operations, which can be desirable, especially in the example case of an emergency backup as part of a failover operation.

In one embodiment, the detection of whether a segment should be compressed is performed while the determination is being made as to whether the segment has already been backed up. In this case, detecting the compressibility of a segment while an identifier is being calculated for the segment and compared with identifiers for data stored in backup storage can result in significant performance improvement of the backup operation.

Configuring the compression operation can also include specifying target compression performance parameters. In one embodiment, the user can specify a target effectiveness. For example, the user can specify that the desired size of the compressed portion should be less than 30% of the original portion size. The user can also specify a compression speed. For example, the user can specify that the compression operation should take no more than 1 second.

Operation 420 shows attempting to compress the portion. Once the attempt to compress the portion is made, decision block 425 shows detecting whether compression was successful. In one embodiment, decision block 425 includes the backup agent comparing the compression operation to compression performance parameters such as effectiveness and/or speed. For example, if a threshold effectiveness was set at 30% of original size, and the backup agent detects that after compression the portion is less than 30% of the portion's size prior to compression, the backup agent can indicate (at operation 430) that the compression was successful. On the other hand, if the backup agent detects, for example, that the size of the portion was reduced to only 50% due to compression, the backup agent can indicate that the compression operation was unsuccessful (operation 435).

In both cases, decision block 440 shows detecting whether more segments are available to be evaluated for their compressibility. If so, the method returns to operation 405 and selects another segment. If not, the method ends.

While the examples above assume that a unit of storage is partitioned into segments, in another embodiment, the unit of storage is not partitioned. In such an embodiment, a portion of the unit of storage is selected according to criteria similar to those disclosed above and an attempt is made to compress the portion. If the attempt is successful, the backup agent indicates that the unit of storage should be compressed. If not, the backup agent indicates that the unit of storage should not be compressed.

Figure 5:
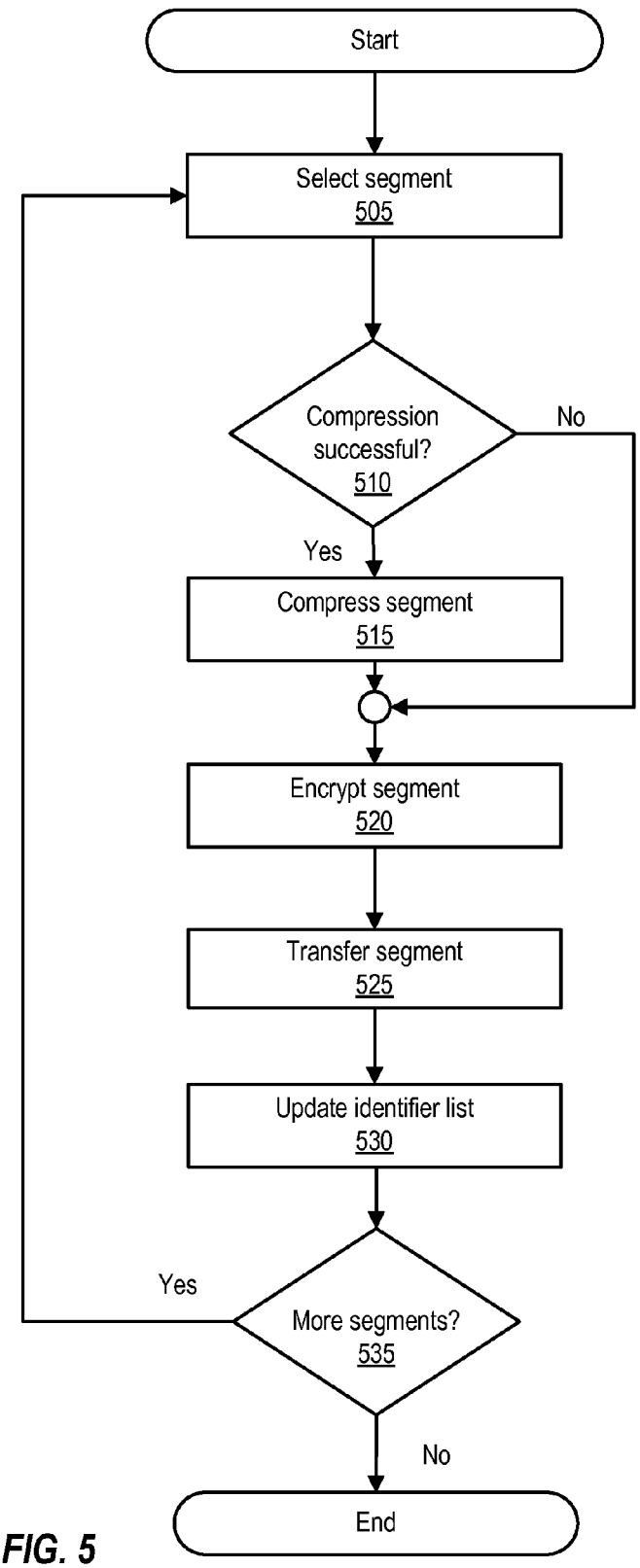
FIG. 5 is a flowchart of a method of backing up a unit of storage, according to one embodiment.

FIG. 5 is a flowchart detailing operation 270 of FIG. 2. FIG. 5 shows a method of backing up a unit of storage. The method begins at operation 505, where a backup agent (e.g., backup agent 140 of FIG. 1) selects a segment. Next, operation 510 shows that the backup agent detects whether an attempt to compress a portion of a segment was successful. If so, the backup agent compresses the segment at operation 515 and then proceeds to operation 520. If the attempt to compress a portion of the segment was unsuccessful, the method proceeds straight to operation 520 without compressing the segment.

At operation 520, the backup agent encrypts a segment. Encryption provides protection from unauthorized access to the data in the segment. Next, operation 525 shows transferring the segment from a client computer (e.g., computing device 110(2) of FIG. 1) to backup storage (e.g., backup data 150 of FIG. 1). A backup program (e.g., backup program 120 of FIG. 1) can receive the transferred segment and store the segment in backup storage. Operation 530 shows that, in response to receiving the segment, the backup program updates an identifier list with an identifier that uniquely identifies the received segment. Updating the identifier list facilitates detecting that the segment is stored in backup storage. For example, if the received segment is selected for future backup operations (e.g., as a result of modification to another segment of the unit of storage that contains the segment) the backup program (or a backup agent) will be able to identify that the segment has already backed up. Thus the backup program will be able to avoid unnecessarily backing up the segment again. Block 535 shows detecting whether more segments require backup. If so, the method returns to operation 505 and selects another segment. If not, the method ends.

Figure 6:
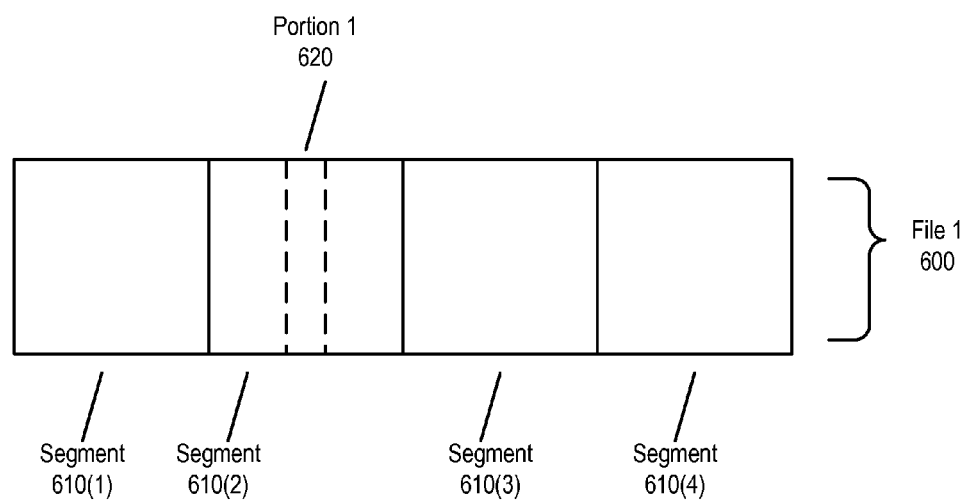
FIG. 6 illustrates a file divided into segments, according to one embodiment.

FIG. 6 is a block diagram of a file divided into segments 610(1)-610(4), according to one embodiment of the present invention. File 600 can be backed up in a computing system like that of FIG. 1. File 600 can have more or less segments than shown in FIG. 6. In one embodiment, a backup program (such a backup program 120 of FIG. 1) breaks file 600 into segments of predefined size. For example, a backup program can specify that the file should be broken into 100 kilobyte segments. In another embodiment, file 600 can be broken into a predefined number of segments. For example, a backup program can specify that the file is to be divided into four segments. In this example, the file can be divided into four equally sized segments or four segments of different sizes.

FIG. 6 also shows a portion (portion 620) of one of the segments 610. In one embodiment, a backup agent (such as backup agent 140 of FIG. 1) selects portion 620 and attempts to compress the portion. If the attempt is successful (according to criteria such as, for example, effectiveness and/or speed) the segment (in this example, segment 610(2)) is compressed. Portion 620 can be selected based on location within the segment. For example, the backup agent can specify that portion 620 should be equidistant from the beginning and end of the segment that contains portion 620. In another embodiment, portion 620 can be selected based on some characteristic of the data contained therein, for example, data density. In another embodiment, the location of the portion can be random. For example, the backup agent can specify a random location within the segment to attempt to compress. In still another embodiment, the portion of the segment can comprise a processed portion of data. For example, the backup agent can select data from several locations in the segment and combine the data (e.g., using a hash algorithm). The backup agent can then attempt to compress the resulting combined data. Doing so has the benefit of providing a portion that may be more representative of the data stored in the segment.

Figure 7:
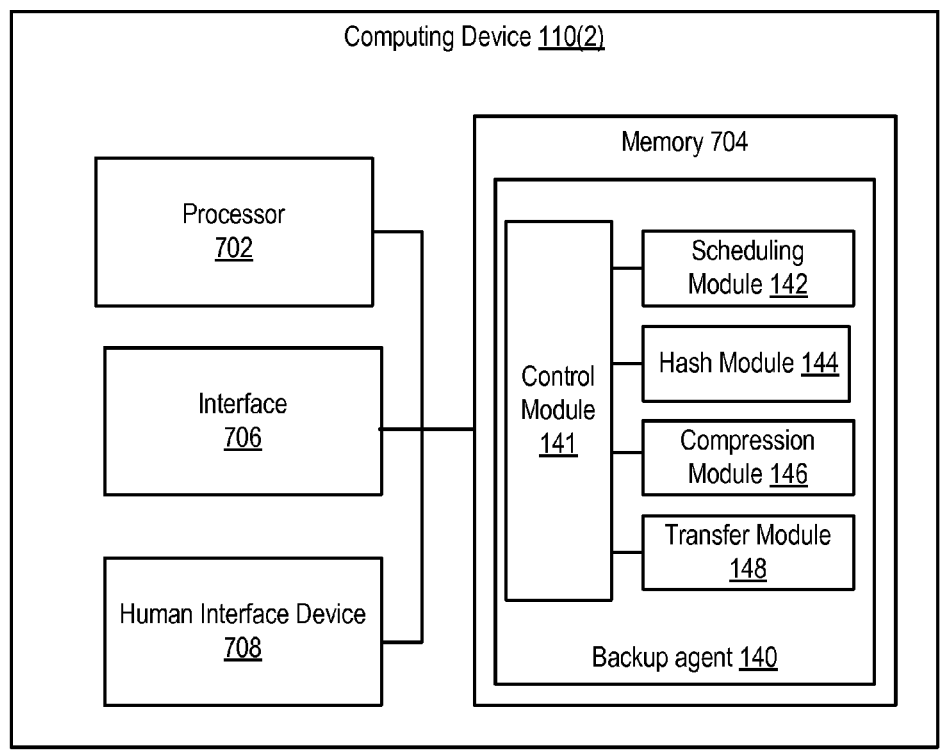
FIG. 7 is a block diagram of a computing device that implements a backup agent, according to one embodiment.

FIG. 7 illustrates how certain elements of a backup agent (e.g., backup agent 140 of FIG. 1) can be implemented in software. FIG. 7 is a block diagram of a computing device. As illustrated, computing device 110(2) includes one or more processors 702 (e.g., microprocessors, PLDs (Programmable Logic Devices), or ASICs (Application Specific Integrated Circuits)) configured to execute program instructions stored in memory 704. Memory 704 can include various types of RAM (Random Access Memory), ROM (Read Only Memory), Flash memory, MEMS (Micro Electro-Mechanical Systems) memory, magnetic core memory, and the like. Memory 704 can include both volatile and non-volatile memory. Computing device 110(2) also includes one or more interfaces 706 and human interface devices 708. Processor 702, memory 704, interface 706, and human interface device 708 are coupled to send and receive data and control signals by a bus or other interconnect.

Interface 706 can include a network interface to various networks (e.g., network 180 of FIG. 1) and/or interfaces to various peripheral buses. Interface 706 can also include an interface to one or more storage devices (e.g., storage devices 170(1) and 170(2) of FIG. 1). Interface 706 can, for example, be used to access information stored on storage device 170(2), to send identifiers to storage device 170(1), and to receive information from storage device 170(2) indicating whether an backup copy of an item identified by a particular identifier is already stored.

Human interface device 708 can include one or more mechanisms to present information in such a format as to be usable by a human observer and/or receive information from a human observer. Human interface device 708 can include, but should not be limited to, such computer input/output (IO) devices as a mouse, keyboard, display, and speakers. A user can, for example, use a keyboard to enter various backup related information and parameters in order to configure backup operations such as those discussed above.

In the embodiment shown in FIG. 7, program instructions and data executable to implement all or part of backup agent functionality are stored in memory 704. The functionality implemented by the program instructions and data can include a control module 141, a scheduling module 142, a hash module 144, a compression module 146, and a transfer module 148. Information usable by the backup agent can also be stored in memory 704.

Control module 141 is configured to control the operations of sub-modules within backup agent 140. Control module 141 can also generate information used to present a user interface to users (e.g., control module 141 can generate information for a graphical user interface, command line interface, or web-based interface).

Scheduling module 142 is configured identify units of storage which need to be backed up. This can include checking a schedule provided by backup program 120 and monitoring units of storage to detect modification of the units of storage. When a unit of storage is identified as needing to be backed up, control module 141 can instruct hash module 144 to generate an identifier for the unit of storage. Hash module 144 can also generate identifiers for segments of a unit of storage.

Control module 141 can provide an identifier to the backup program and receive responsive information, via interface 706, indicating whether the unit of storage or segment is already stored in backup storage. If not, control module 141 can instruct compression module 146 to detect whether or not the units of storage should be compressed for backup. Compression module 146 is configured to select a portion of a given unit of storage or segment of a unit of storage and attempt to compress the portion. Compression module 146 then uses the results of the attempt to indicate whether the unit of storage should be compressed. If so, control module 141 can instruct compression module 146 to compress the unit of storage.

Control module 141 can also invoke transfer module 148. Transfer module 148 is configured to encrypt and transfer units of storage. When control module 141 specifies a unit of storage to transfer module 148, transfer module 148 can encrypt the unit of storage and transfer the unit of storage to backup storage.

Program instructions and data implementing backup agent 140 can be stored on various computer readable storage media such as memory 704. In some embodiments, such software is stored on a computer readable storage medium such as a CD (Compact Disc), DVD (Digital Versatile Disc), hard disk, optical disk, tape device, floppy disk, and the like. In order to be executed by processor 702, instructions and data implementing backup agent 140 can be loaded into memory 704 from other computer readable storage medium. Instructions and/or data implementing backup module 140 can also be transferred to computing device 110(2) for storage in memory 704 via a network such as the Internet or upon a carrier medium.

Although the present invention has been described in connection with several embodiments, the invention is not intended to be limited to the specific forms set forth herein. On the contrary, it is intended to cover such alternatives, modifications, and equivalents as can be reasonably included within the scope of the invention as defined by the appended claims.

What is claimed is:

1. A method comprising:
    detecting that a unit of storage from a backup client is to be backed up to a storage system;
    in response to the detecting, determining whether to compress the unit of storage,
        wherein the determining comprises
        identifying a location within the unit of storage, wherein the identifying comprises
            scanning the unit of storage, wherein
                the scanning comprises comparing density of data stored in
                    the unit of storage with a specified data density criterion, and
                    the specified data density criterion comprises a ratio of written storage location to unwritten storage locations,
                determining whether the density of the data stored at the location meets the specified data density criterion prior to attempting to compress the data stored at the location, and
                calculating an offset from the beginning of the unit of storage to the location,
            selecting a portion of the unit of storage beginning at the offset, wherein data stored in the portion of the unit of storage comprises the data stored at the location,
                the portion of the unit of storage is smaller than the unit of storage, and
                the portion of the unit of storage begins at the offset from the beginning of the unit of storage and ends before the end of the unit of storage, and
            attempting to compress the data stored in the portion of the unit of storage; and
            if the attempting is successful for the portion of the unit of storage, compressing the entirety of the unit of storage.

2. The method of claim 1, wherein the detecting comprises:
    detecting at least one of a modification of data in the unit of storage and the occurrence of a specified time interval.

3. The method of claim 1, wherein the detecting comprises:
    calculating a hash value for the unit of storage; and
    using the calculated hash value to detect whether the unit of storage exists on a backup server.

4. The method of claim 3, wherein the detecting is performed in parallel with the determining.

5. The method of claim 1, wherein the determining comprises calculating at least one of a compression efficiency and a compression time.

6. The method of claim 5, wherein
    calculating the compression efficiency comprises calculating a ratio between a size of the portion after compression and a size of the portion prior to compression.

7. The method of claim 1, further comprising:
    selecting a first compression algorithm for compressing the data stored in the portion based on a speed of the first compression algorithm; and
    selecting a second compression algorithm for compressing the unit of storage based on an efficiency of the second compression algorithm, wherein
        the first compression algorithm and second compression algorithm are different from one another.

8. The method of claim 1, further comprising:
    encrypting the unit of storage; and
    transmitting the unit of storage to a backup server.

9. A non-transitory computer readable storage medium storing program instructions, wherein the program instructions are executable by one or more processors to:
    detect that a unit of storage from a backup client is to be backed up to a storage system;
    in response to the detecting, determining whether to compress the unit of storage,
        wherein the determining comprises
        identifying a location within the unit of storage, wherein the identifying comprises
            scanning the unit of storage, wherein
                the scanning comprises comparing density of data stored in
                    the unit of storage with a specified data density criterion, and
                    the specified data density criterion comprises a ratio of written storage location to unwritten storage locations,
                determining whether the density of the data stored at the location meets the specified data density criterion prior to attempting to compress the data stored at the location, and
                calculating an offset from the beginning of the unit of storage to the location,
            selecting a portion of the unit of storage beginning at the offset, wherein data stored in the portion of the unit of storage comprises the data stored at the location,
                the portion of the unit of storage is smaller than the unit of storage, and
                the portion of the unit of storage begins at the offset from the beginning of the unit of storage and ends before the end of the unit of storage, and
            attempting to compress the data stored in the portion of the unit of storage; and
            if the attempting is successful for the portion of the unit of storage, compressing the entirety of the unit of storage.

10. The non-transitory computer readable storage medium of claim 9, wherein the detecting comprises:
  detecting at least one of a modification of data in the unit of storage and the occurrence of a specified time interval.

11. The non-transitory computer readable storage medium of claim 9, wherein the detecting comprises:
  calculating a hash value for the unit of storage; and
  using the calculated hash value to detect whether the unit of storage exists on a backup server.

12. The non-transitory computer readable storage medium of claim 11, wherein the detecting is performed in parallel with the determining.

13. The non-transitory computer readable storage medium of claim 9, wherein the determining comprises:
  calculating at least one of a compression efficiency and a compression time.

14. The non-transitory computer readable storage medium of claim 13, wherein calculating the compression efficiency comprises calculating a ratio between a size of the portion after compression and a size of the portion prior to compression.

15. The non-transitory computer readable storage medium of claim 9, wherein the instructions are further executable to:
  select a first compression algorithm for compressing the data stored in the portion based on a speed of the first compression algorithm; and
  select a second compression algorithm for compressing the unit of storage based on an efficiency of the second compression algorithm, wherein
  the first compression algorithm and second compression algorithm are different from one another.

16. The non-transitory computer readable storage medium of claim 9, wherein the instructions are further executable to:
encrypt the unit of storage; and transmit the unit of storage to a backup server.

17. A system comprising:
a storage system;
one or more processing means coupled to the storage system;
a backup client coupled to the storage system, the backup client comprising
  means for detecting that a unit of storage is to be backed up;
  means for determining whether to compress the unit of storage, wherein the determining is performed in response to the detecting and the determining comprises identifying a location within the unit of storage, wherein the identifying comprises
    scanning the unit of storage, wherein
      the scanning comprises comparing density of data stored in the unit of storage with a specified data density criterion, and
      the specified data density criterion comprises a ratio of written storage locations to unwritten storage locations,
    determining whether the density of the data stored at the location meets the specified data density criterion prior to attempting to compress the data stored at the location, and
    calculating an offset from the beginning of the unit of storage,
  selecting a portion of the unit of storage beginning at the offset, wherein
    data stored in the portion of the unit of storage comprises the data stored at the location,
    the portion of the unit of storage is smaller than the unit of storage, and
    the portion of the unit of storage begins at the offset from the beginning of the unit of storage and ends before the end of the unit of storage, and
  attempting to compress the data stored in the portion of the unit of storage; and
  means for compressing the entirety of the unit of storage if the determining means indicates that the attempting is successful for the portion of the unit of storage.

18. The system of claim 17, further comprising:
means for selecting a first compression algorithm for compressing the data stored in the portion based on a speed of the first compression algorithm; and
means for selecting a second compression algorithm for compressing the unit of storage based on an efficiency of the second compression algorithm, wherein
the first compression algorithm and second compression algorithm are different from one another.

\* \* \* \* \*